United States Patent [19]

Bongartz et al.

[11] Patent Number: 5,127,950
[45] Date of Patent: Jul. 7, 1992

[54] SHORT-PRISMATIC ALUMINUM HYDROXIDE, PROCESS FOR PREPARING SAME FROM SUPERSATURATED SODIUM ALUMINATE-LIQUOR, AND COMPOSITIONS CONTAINING SAME

[75] Inventors: Hans Bongartz, Elsdorf; Georg Kirschbaum, Hürtgenwald; Klaus Kramer, Kerpen-Horrem, all of Fed. Rep. of Germany

[73] Assignee: Lonza Ltd., Gampel/Valais, Switzerland

[21] Appl. No.: 580,478

[22] Filed: Sep. 11, 1990

[30] Foreign Application Priority Data

Sep. 14, 1989 [CH] Switzerland .................. 3356/89

[51] Int. Cl.$^5$ .............................................. C01F 7/14
[52] U.S. Cl. ........................... 106/401; 106/18.26; 106/287.17; 106/404; 106/423; 106/483; 23/305 A; 423/124; 423/127; 423/629
[58] Field of Search ............ 423/629, 124, 127; 106/18.26, 442, 483, 287.17, 404; 23/305 A

[56] References Cited

U.S. PATENT DOCUMENTS

| | | | |
|---|---|---|---|
| 2,549,549 | 4/1951 | Wall | 23/143 |
| 2,657,978 | 11/1953 | Johnson | 23/143 |
| 2,707,669 | 5/1955 | Houston et al. | 23/143 |
| 3,486,850 | 12/1969 | Day | 23/143 |
| 3,545,923 | 12/1970 | Mercier et al. | 23/143 |
| 3,649,184 | 3/1972 | Featherston | 23/143 |
| 3,838,980 | 10/1974 | Gnyra | 23/301 |
| 3,906,084 | 9/1975 | Gnyra | 423/629 |
| 4,150,952 | 4/1979 | Lafleur et al. | 23/301 |
| 4,234,559 | 11/1980 | Tschamper | 423/629 |
| 4,311,486 | 1/1982 | Yamada et al. | 423/121 |
| 4,364,919 | 12/1982 | Yamada et al. | 423/121 |
| 4,511,542 | 4/1985 | Anjier et al. | 423/629 |
| 4,574,074 | 3/1986 | Cristol et al | 423/124 |
| 4,582,697 | 4/1986 | Cristol et al. | 423/629 |
| 4,617,179 | 10/1986 | Veyrier | 423/629 |
| 4,732,742 | 3/1988 | Puig | 423/124 |
| 4,946,666 | 8/1990 | Brown | 423/124 |

FOREIGN PATENT DOCUMENTS 2298510 8/1976 France .

OTHER PUBLICATIONS

Van Hook, "Crystallization Theory and Practice"; 1961; pp. 212, 219, Reinhold, London.
Mullin, "Crystallization", 1961; pp. 159, 160, 189, 190; Butterworths, London.
Larson, ed., "Crystallization from Solution:Factors Influencing Size distribution", 1971 pp. 53–65; Amer. Inst. Ch. Eng., N.Y., N.Y.; Chem. Eng. Prog. Symp. Ser. #110, v. 67.
Moore et al., "Experimental Methods In Organic Chemistry", 1982, 3rd ed., pp. 30, 31, Saunders College Publishing.
N vlt et al., "The Kinetics of Industrial Crystallization"; 1985, pp. 36, 37, 99, 100, 260, 261, 262; Elsevier, N.Y.

Primary Examiner—William R. Dixon, Jr.
Assistant Examiner—Scott L. Hertzog
Attorney, Agent, or Firm—Fisher, Christen & Sabol

[57] ABSTRACT

Process for the production of a short-prismatic aluminum hydroxide by decomposing a supersaturated sodium aluminate liquor. The product can be used as a pigment and filler in the paper industry, as a flame-retardant filler in plastics and as a white pigment in paints and enamels.

22 Claims, No Drawings

SHORT-PRISMATIC ALUMINUM HYDROXIDE, PROCESS FOR PREPARING SAME FROM SUPERSATURATED SODIUM ALUMINATE-LIQUOR, AND COMPOSITIONS CONTAINING SAME

BACKGROUND OF THE INVENTION

1. Field Of The Invention

The invention relates to a process for the production of a short-prismatic aluminum hydroxide as well as the use of the aluminum hydroxide as spread coating pigment in paper and cardboard coating, as flame-retardant filler in plastics and as white pigment in paints and enamels.

2. Background Art

A process is known from German Patent No. 3,338,186 for the production of aluminum hydroxide with an average grain diameter under 4 microns and a specific surface between 10 and 25 m$^2$/g. In this process, the actual crystallization is performed at a constant temperature over the entire absorptive precipitation time. and crystals are obtained. which exhibit a pronounced platelet shape. This platelet structure is disadvantageous in different uses and also in production. Thus, for example, by the greatly platelet-shaped character, the filtration and washing of the absorptively precipitated aluminum hydroxide suspension is made more difficult. Suspensions, dispersions or plastic mixtures, which contain greatly platelet-shaped aluminum hydroxide as fillers, exhibit very high viscosities and cannot be easily filtered. Other drawbacks are the poor hiding power and the poor coating volume in the brushing paint as well as less gloss.

BROAD DESCRIPTION OF THE INVENTION

The main object of the invention is to develop an improved aluminum hydroxide, which does not exhibit the above-listed drawbacks. Other objects and advantages of the invention are set out herein or are obvious herefrom to one ordinarily skilled in the art.

The objects and advantages of the invention are achieved by the processes and product of the invention.

The invention involves a process for the production of a short-prismatic aluminum hydroxide, with an average grain diameter below 10 microns. The process includes decomposing a supernatural sodium aluminate liquor in heat in the presence of a seeding material consisting of aluminum hydroxide and then separating the precipitated aluminum hydroxide. The aluminate liquor is cooled from a higher temperature between 50° and 80° C. over a period of 8 to 25 hours to a lower temperature of 30° to 60° C., and the lower temperature is maintained for a period of 20 to 80 hours.

Preferably the aluminate liquor is cooled from a higher temperature between 55 and 70° C. over a period of 8 to 12 hours to a lower temperature of 30° to 50° C., and this temperature is maintained for 30 to 60 hours. Preferably the sodium aluminate liquor has a concentration of caustic Na$_2$O between 70 and 230 g/l and the molar ratio of caustic Na$_2$O to dissolved Al$_2$O$_3$ is suitably between 1.25 and 1.75. Preferably the seeding material has an average grain diameter between 1.0 and 2.0 microns, and the specific surface, measured according to BET, is between 10 and 30 m$^2$/g. More preferably the seeding material has an average grain diameter between 1.4 and 1.6 microns and the specific surface, measured according to BET, is between 15 and 20 m$^2$/g. Preferably the amount of seeding material is 2 to 8 g/l of sodium aluminate liquor.

The invention also involves the short-prismatic aluminum hydroxide, produced according to the invention process. The invention aluminum hydroxide has a specific surface between 3 m$^2$/g and 9 m$^2$/g. measured according to BET, and an average in diameter is 0.5 to 1.1 microns, measured as d$_{50}$ value according to the laser scattering method. Preferably the aluminum hydroxide has a specific surface between 4 and 6 m$^2$/g.

The invention aluminum hydroxide can be used as pigment and filler in paper in the paper industry, as flame-retardant filler in plastics, and as white pigment in paints and enamels.

DETAILED DESCRIPTION OF THE INVENTION

The process for the production of short-prismatic aluminum hydroxide takes place according to the invention by cooling a sodium aluminate liquor, obtained from bauxite decomposition according to the Bayer process, over a period of 8 to 25 hours. from a higher temperature to a lower temperature, and the lower temperature is maintained for a period of 20 to 80 hours. The aluminate liquor is cooled from a higher temperature between 50° and 80° C., preferably between 55° and 70° C., to a lower temperature of 30° to 60° C., preferably to 30° to 50 C., especially to 40 C. The cooling time of the aluminate liquor from the higher temperature to the lower temperature is 8 to 25 hours, preferably 8 to 12 hours. The lower temperature is maintained over a period of 20 to 80 hours, preferably of 30 to 60 hours.

The concentration of caustic Na$_2$O of the sodium aluminate solution is suitably between 70 and 230 g/l preferably between 130 and 150 g/l. The molar ratio of caustic Na$_2$O to dissolved Al$_2$O$_3$ is suitably between 1.25 and 1.75. Crushed aluminum hydroxide with an average grain diameter suitably between 1.0 and 2.0 microns, preferably between 1.4 and 1.6 microns, and specific surface suitably between 10 and 30 m$^2$/g, preferably between 15 and 20 m$^2$/g, is used as seeding material. The amount of seeding material is suitably 2 to 8 g/l of sodium aluminate liquor.

The decomposition of the sodium aluminate solution is performed until a molar ratio of Na$_2$O to dissolved Al$_2$O$_3$ suitably between 2 and 4, preferably between 2.3 and 3.3, is reached.

The aluminum hydroxide produced by the process according to the invention process exhibits a small average grain diameter, a small specific surface and a short-prismatic structure. The specific surface, measured according to BET, is in a range between 3 and 9 m$^2$/g, preferably a specific surface between 4 and 6 m$^2$/g, is obtained. The average grain diameter is 0.5 to 1.1 microns, measured as d$_{50}$ value according to the laser scattering method.

The short-prismatic aluminum hydroxide is suitably used as pigment and filler in the paper industry, as flame-retardant filler in plastics and as white pigment in paints and enamels.

EXAMPLES 10 liters of sodium aluminate liquor with an Al$_2$O$_3$ concentration of 154.5 g/l and an Na$_2$O concentration of 138.2 g/l (molar ratio of caustic Na$_2$O to dissolved Al$_2$O$_3$ being 1.47), obtained from bauxite decomposition according to the Bayer process, were mixed with a seeding suspension at a temperature of x° C. (see Table 1). The amount of seeding material was 5 g/l relative to the sodium aluminate liquor with the concentration indicated above. As seeding material, a standard was used with an average grain diameter of about 1.5 microns and a specific surface of 15 to 20 m²/g (measured according to BET). The suspension was stirred with a blade mixer and cooled to 40° C. in the first 10 hours. It was crystallized out for 30 to 50 hours more and then filtered with a Buechner funnel and washed with deionized water. The filter cake was dried at 120° C. and then deagglomerated in a Retsch mill.

TABLE 1

| Example No. | Temp. x° C. | $d_{50}$ microns | BET m²/g | Remarks |
|---|---|---|---|---|
| 1 | 40° | 0.96 | 9.3 | Comparison according to prior art |
| 2 | 57° | 1.10 | 6.5 | according to the invention |
| 3 | 66° | 0.96 | 5.9 | according to the invention |
| 4 | 69° | 0.99 | 5.9 | according to the invention |
| 5 | 69° | 1.00 | 5.3 | according to the invention |
| 6 | 72° | 0.99 | 3.8 | according to the invention |

The hiding power of the aluminum hydroxide was examined in the following formulations in blends with $CaCO_3$ (Hydrocarb 90) and blends with $CaCO_3$ (Hydrocarb 90) and fine-particle clay (Amazon 88).

EXAMPLE 7

| Binder: Dow-Latex 685 | 13.8 parts |
|---|---|
| Cobinder: Finnfix CMC FF5 | 1.2 parts |
| Dispersing agent: Na Polyacrylate (Poly salt CAL) | 0.3 parts |
| Spread coating pigments | 100.0 parts |
| Solid content of brushing paint | 67% |

TABLE 2

| | Pigment mixtures (Portions [%]) | | | | |
|---|---|---|---|---|---|
| Brushing paint | $CaCO_3$ | Clay | Aluminum hydroxide platelet-shaped comparison Example 1 | Aluminum hydroxide short-prismatic-Example 2 | Remarks |
| 1 | 70 | — | 30 | — | Comparison according to prior art |
| 2 | 70 | — | — | 30 | According to the invention |
| 3 | 70 | 15 | 15 | — | Comparison according to prior art |
| 4 | 70 | — | — | 15 | According to the invention |
| 5 | 70 | 15 | 7.5 | 7.5 | According to the invention |

The brushing paints were brushed on gray precoated paper of (brightness 63±0.5%) with a DOW Laborcoater according to the bent blade principle [H. Stranger, Wochenblatt fuer Papierfabrikation (Weekly for Papermaking), 106, 287-290 (1978), No. 11/12]. The coat weight was 10 g/m². The brightness of the brushing paint was determined with Elrepho No. 65787/DIN 53145 (Tappi T 452/T 525), at a wavelength of 457 nm.

The results are summarized in Table 3.

TABLE 3

| | Hiding power of the pigment mixtures Brushing Paint | | | | |
|---|---|---|---|---|---|
| | 1 | 2 | 3 | 4 | 5 |
| Brightness | 64.8 | 67.4 | 64.8 | 69.1 | 66.8 |
| Gloss | 16.3 | 15.9 | 17.3 | 14.0 | 21.4 |

EXAMPLE 8

The hiding power of the aluminum hydroxide was also examined in the following formulations in blends with kaolin (Kaobrite, Boliden company (S)), with $CaCO_3$ (Hydrocarrb 90).

| Binder: Dow-Latex 685 | 13.8 parts |
|---|---|
| Cobinder: Finnfix CMC FF5 | 1.2 parts |
| Dispersing agent: Na Polyacrylate (Poly salt CAL) | 0.3 parts |
| Spread coating pigments | 100.0 parts |
| Solid content of brushing paint | 67% |

The brushing paints were brushed on with a doctor blade machine (Gockel company, Model 202/Series No. 16040) on so-called opacity charts (The Leneta Company, P.O. Box 86, Ho-Ho-Kus, N.Y. 07423). The coat weight was 12 g/m². The solid content of the brushing apints for the doctor blade machine was about 50 percent.

With the quality charts a white cardboard with a black stripe in the center is involved. This cardboard is used to be able to make statements about the hiding (opacity). The opacities indicated in Table 6 were measured according to DIN 53146 with the Elrepho device indicated in Example 7.

The brightness was determined according to Example 7.

TABLE 4

| Brushing paint | Kaolin | Aluminum hydroxide platelet-shaped $d_{50}$ = 1.1 microns (comp. ac. prior art) | Aluminum hydroxide short-prismatic - Example 6 | Remarks |
|---|---|---|---|---|
| 6 | 80 | 20 | — | Comparison according to prior art |
| 7 | 80 | — | 20 | According to the invention |
| 8 | 60 | 40 | — | Comparison according to prior art |
| 9 | 60 | — | 40 | According to the invention |

TABLE 5

| | Hiding Power of Pigment Mixtures Brushing Paint | | | |
|---|---|---|---|---|
| | 6 | 7 | 8 | 9 |
| Brightness | 66.9 | 67.9 | 68.2 | 68.9 |

TABLE 5-continued

| | Hiding Power of Pigment Mixtures Brushing Paint | | | |
|---|---|---|---|---|
| | 6 | 7 | 8 | 9 |
| Opacity | 50.3 | 54.4 | 53.5 | 54.6 |

TABLE 6

| Brushing paint | Pigment mixtures (portions) [%] | | | | Remarks |
|---|---|---|---|---|---|
| | Kaolin | CaCO₃ | Aluminum hydroxide platelet-shaped $d_{50}$ = 1.5 micron (comp.ac. prior art) | Aluminum hydroxide short-prismatic-Example 6 | |
| 10 | — | — | 100 | — | Comparison according to prior art |
| 11 | — | — | — | 100 | according to the invention |
| 12 | 60 | 20 | 20 | — | Comparison according to prior art |
| 13 | 60 | 20 | — | 20 | according to the invention |

TABLE 7

| | Hiding Power Of Pigment Mixtures Brushing Paint | | | |
|---|---|---|---|---|
| | 10 | 11 | 12 | 13 |
| Brightness | 69.4 | 74.3 | 67.3 | 68.9 |
| Opacity | 40.1 | 58.4 | 38.3 | 41.8 |

What is claimed is:

1. Process for the production of an aluminum hydroxide consisting of short-prismatic aluminum hydroxide, with an average grain diameter, of 0.5 to 1.1 micron, comprising starting decomposition of a supersaturated sodium aluminate liquor in heat in the presence of a seeding material consisting of aluminum hydroxide, cooling the decomposed sodium aluminate liquor from a higher temperature between 50° and 80° C. over a period of 8 to 25 hours to a lower temperature of 30° to 60° C., the temperature being lowered a sufficient magnitude in absolute value whereby said short-prismatic aluminum hydroxide is formed, maintaining the decomposed sodium aluminate at the lower temperature for a period of 20 to 80 hours, said short-prismatic aluminum hydroxide precipitating from the decomposed sodium aluminate liquor, and then separating said precipitated short-prismatic aluminum hydroxide from the decomposed sodium aluminate liquor.

2. Process according to claim 1 wherein the temperature is lowered by at least 17° C.

3. Process according to claim 1 wherein the aluminate liquor is cooled from a higher temperature between 55° and 70° C. over a period of 8 to 12 hours to a lower temperature of 30° to 50° C., and the lower temperature is maintained for 30 to 60 hours.

4. Process according to claim 3 wherein the sodium aluminate liquor has a concentration of caustic Na₂O between 70 to 230 g/l, and the molar ratio of caustic Na₂O to dissolved Al₂O₃ is between 1.25 and 1.75.

5. Process according to claim 4 wherein the seeding material has an average grain diameter between 1.0 and 2.0 microns, and the specific surface, measured according to BET, is between 10 and 30 m²/g.

6. Process according to claim 5 wherein the amount of seeding material is 2 to 8 g/l of the sodium aluminate liquor.

7. Process according to claim 5 wherein the seeding material has an average grain diameter between 1.4 and 1.6 microns and the specific surface, measured according to BET, is between 15 and 20 m²/g.

8. Process according to claim 7 wherein the amount of the seeding material is 2 to 8 g/l of the sodium aluminate liquor.

9. Process according to claim 2 wherein the sodium aluminate liquor has a concentration of caustic Na₂O between 70 and 230 g/l, and the molar ratio of caustic Na₂O to dissolved Al₂O₃ is between 1.25 and 1.75.

10. Process according to claim 2 wherein the seeding material has an average grain diameter between 1.0 and 2.0 microns, and the specific surface, measured according to BET, is between 10 and 30 m²/g.

11. Aluminum hydroxide consisting of short-prismatic aluminum hydroxide which has a specific surface between 3 m²/g and 9 m²/g, measured according to BET, and an average grain diameter is 0.5 to 1.1 micron, measured as $d_{50}$ value according to the laser scattering method, said alumina hydroxide being produced by a process comprising starting decomposition of a supersaturated sodium aluminate liquor in heat in the presence of a seeding material consisting of aluminum hydroxide, cooling the sodium aluminate liquor from a higher temperature between 50° and 80° C. over a period of 8 to 25 hours to a lower temperature of 30° to 60° C., the temperature being lowered a sufficient magnitude in absolute value whereby said short-prismatic aluminum hydroxide is formed, maintaining the decomposed sodium aluminate at the lower temperature for a period of 20 to 80 hours, said short-prismatic aluminum hydroxide precipitating from the decomposed sodium aluminate liquor, and then separating said precipitated short-prismatic aluminum hydroxide from the decomposed sodium aluminate liquor.

12. Aluminum hydroxide according to claim 11 wherein, in the production process, the temperature is lowered by at least 17° C.

13. Aluminum hydroxide according to claim 11, which has a specific surface between 4 and 6 m²/g.

14. Process for preparing a paper containing a pigment and filler, the improvement comprising incorporating the aluminum hydroxide according to claim 11 as the pigment and filler into the paper.

15. Process for preparing a plastic containing a flame-retardant filler, the improvement comprising incorporating the aluminum hydroxide according to claim 11 as the flame-retardant filler into the plastic.

16. Process for preparing a paint or enamel containing a pigment, the improvement comprising incorporating the aluminum hydroxide according to claim 11 a white pigment into the paint or enamel.

17. Paper containing the aluminum hydroxide according to claim 11 in the paper as a pigment and filler.

18. Plastic containing the aluminum hydroxide according to claim 11 in the plastic as a flame-retardant filler.

19. Paint or enamel containing the aluminum hydroxide according to claim 11 in the paint or enamel as a white pigment.

20. Process for preparing a paper containing a pigment and filler, the improvement comprising incorporating the aluminum hydroxide according to claim 13 as the pigment and filler into the paper.

21. Process for preparing a plastic containing a flame-retardant filler, the improvement comprising incorporating the aluminum hydroxide according to claim 13 as the flame-retardant filler in the plastic.

22. Process for preparing a paint or enamel containing a pigment, the improvement comprising incorporating the aluminum hydroxide according to claim 13 the white pigment in the paint or enamel.

* * * * *